US011212813B2

United States Patent
Sun et al.

(10) Patent No.: US 11,212,813 B2
(45) Date of Patent: Dec. 28, 2021

(54) CONFIGURATION OF CONTROL RESOURCES

(71) Applicant: QUALCOMM Incorporated, San Diego, CA (US)

(72) Inventors: Jing Sun, San Diego, CA (US); Wanshi Chen, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/868,545

(22) Filed: Jan. 11, 2018

(65) Prior Publication Data

US 2018/0206247 A1 Jul. 19, 2018

Related U.S. Application Data

(60) Provisional application No. 62/446,268, filed on Jan. 13, 2017.

(51) Int. Cl.
*H04W 72/08* (2009.01)
*H04L 5/00* (2006.01)
*H04W 72/04* (2009.01)

(52) U.S. Cl.
CPC ......... *H04W 72/085* (2013.01); *H04L 5/0053* (2013.01); *H04W 72/042* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 2013/0051214 A1* | 2/2013 | Fong | H04W 24/10 370/216 |
| 2013/0242882 A1* | 9/2013 | Blankenship | H04L 5/0041 370/329 |

(Continued)

OTHER PUBLICATIONS

Interdigital Communications: "Dl Control Channel Common Search Space", 3GPP Draft; R1-1700705, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 10, 2017 (Jan. 10, 2017), XP051203024, 2 pages, Retrieved from the Internet: URL:http://www.3gpp.org/ftp/tsg_ran/WG1_RL1/TSGR1_AH/NR_AH_1701/Docs/ [retrieved on Jan. 10, 2017].

(Continued)

*Primary Examiner* — Adnan Baig
(74) *Attorney, Agent, or Firm* — Arent Fox, LLP

(57) ABSTRACT

Various aspects provides an example method, an apparatus, and/or a computer readable medium for configuring common control resource set at an gNB, which may include configuring, at the gNB, a first type and a second type of common control resource set, and indicating, to a user equipment (UE), the first type and the second type of common control resource set based at least on the configuration. Additional aspects may include receiving, at the UE, configuration information of a first type and a second type of common control resource set from a gNB, and decoding, at the UE, the first type and the second type of common control resource set based at least on the configuration information.

34 Claims, 7 Drawing Sheets

(56) References Cited

U.S. PATENT DOCUMENTS

| | | | | |
|---|---|---|---|---|
| 2014/0293942 | A1* | 10/2014 | Kang | H04L 5/0037 370/329 |
| 2015/0257137 | A1 | 9/2015 | Chen et al. | |
| 2016/0043849 | A1* | 2/2016 | Lee | H04W 72/042 370/329 |
| 2016/0302174 | A1* | 10/2016 | Chatterjee | H04W 72/06 |
| 2016/0353440 | A1* | 12/2016 | Lee | H04W 72/0453 |
| 2018/0124697 | A1* | 5/2018 | Nair | H01Q 1/243 |

OTHER PUBLICATIONS

Interdigital Communications: "Downlink Control Channel Framework", 3GPP Draft; R1-1700704, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 10, 2017 (Jan. 10, 2017), XP051203023, 4 pages, Retrieved from the Internet: URL:http://www.3gpp.org/ftp/tsg_ran/WG1_RL1/TSGR1_AH/NR_AH_1701/Docs/ [retrieved on Jan. 10, 2017].

International Search Report and Written Opinion—PCT/US2018/013519—ISA/EPO—dated Apr. 3, 2018.

Motorola Mobility: "DL Control Channel for NR", 3GPP Draft; R1-1700882_DL_Control_VO, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2016-Jan. 20, 2016, Jan. 10, 2017 (Jan. 10, 2017), XP051203182, 3 pages, Retrieved from the Internet: URL:http://www.3gpp.org/ftp/tsg_ran/WG1_RL1/TSGR1_AH/NR_AH_1701/Docs/ [retrieved on Jan. 10, 2017].

Qualcomm Incorporated: "UE Power Saving for PDCCH Monitoring", 3GPP Draft; R1-1700817_UE_Power_Saving_PDCCH_Monitoring, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 10, 2017 (Jan. 10, 2017), XP051203130, 3 pp., Retrieved from the Internet:Url: http://www.3gpp.org/ftp/tsg_ran/WG1_RL1/TSGR1_AH/NR_AH_1701/Docs/ [retrieved on Jan. 10, 2017].

Samsung: "System Information Delivery", 3GPP Draft; R1-1700888-NR System Info Delivery, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 10, 2017 (Jan. 10, 2017), XP051203188, 10 pages, Retrieved from the Internet: URL:http://www.3gpp.org/ftp/tsg_ran/WG1_RL1/TSGR1_AH/NR_AH1701/Docs/ [retrieved on Jan. 10, 2017].

Taiwan Search Report—TW107101196—TIPO—dated Sep. 30, 2021.

* cited by examiner

CONFIGURATION OF CONTROL RESOURCES

CROSS-REFERENCE TO RELATED APPLICATION

The present Application for Patent claims priority to Provisional Application No. 62/446,268 entitled "Configuration of Control Resources" filed Jan. 13, 2017, which is assigned to the assignee hereof, and incorporated herein by reference in its entirety.

BACKGROUND

The present disclosure relates generally to signaling in wireless networks, and more particularly, to control channel design in wireless networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

In 5G/NR wireless networks, a user equipment (UE) has to monitor common control resource set (or common resource set) periodically. The monitoring of the common control resource set has to be balanced between duty cycle of downlink transmissions and associated delays.

Therefore, there is a desire for a method and an apparatus to configure common control resource set to achieve/improve the balance in 5G/NR networks.

SUMMARY OF THE INVENTION

Various aspects of the present disclosure relate to a gNB operable to configure one or more types of common control resource sets.

In an aspect, a method of wireless communications is disclosed. In some aspects, the method may include configuring, at the gNB, a first type and a second type of common control resource set, and indicating, to a user equipment (UE), the first type and the second type of common control resource set based at least on the configuration.

In another aspect, an apparatus for wireless communications is disclosed. The apparatus may include a processor, a transceiver, and a memory coupled to the processor. The memory may include instructions executable by the processor to configure a first type and a second type of common control resource set, and indicate, to a UE, the first type and the second type of common control resource set based at least on the configuration.

In another aspect, an apparatus for wireless communications is disclosed. The apparatus may include means for configuring a first type and a second type of common control resource set, and means for indicating to a UE the first type and the second type of common control resource set based at least on the configuration.

In yet another aspect, a computer-readable medium storing computer executable code for wireless communications is disclosed. The computer-readable medium may include code for configuring, at a gNB, a first type and a second type of common control resource set, and code for indicating to a UE, the first type and the second type of common control resource set based at least on the configuration.

In an aspect, a method of wireless communications at a UE is disclosed. In some aspects, the method may include receiving, at the UE, configuration information of a first type and a second type of common control resource set from an gNB, and decoding, at the UE, the first type and the second type of common control resource set based at least on the configuration information.

In another aspect, an apparatus for wireless communications is disclosed. The apparatus may include a processor, a transceiver, and a memory coupled to the processor. The memory may include instructions executable by the processor to receive configuration information of a first type and a second type of common control resource set from an gNB, and decode the first type and the second type of common control resource set based at least on the configuration information.

In another aspect, an apparatus for wireless communications is disclosed. The apparatus may include means for receiving configuration information of a first type and a second type of common control resource set from an gNB, and means for decoding the first type and the second type of common control resource set based at least on the configuration information.

In yet another aspect, a computer-readable medium storing computer executable code for wireless communications is disclosed. The computer-readable medium may include code for receiving configuration information of a first type and a second type of common control resource set from an gNB, and code for decoding the first type and the second type of common control resource set based at least on the configuration information.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

Figure 1:
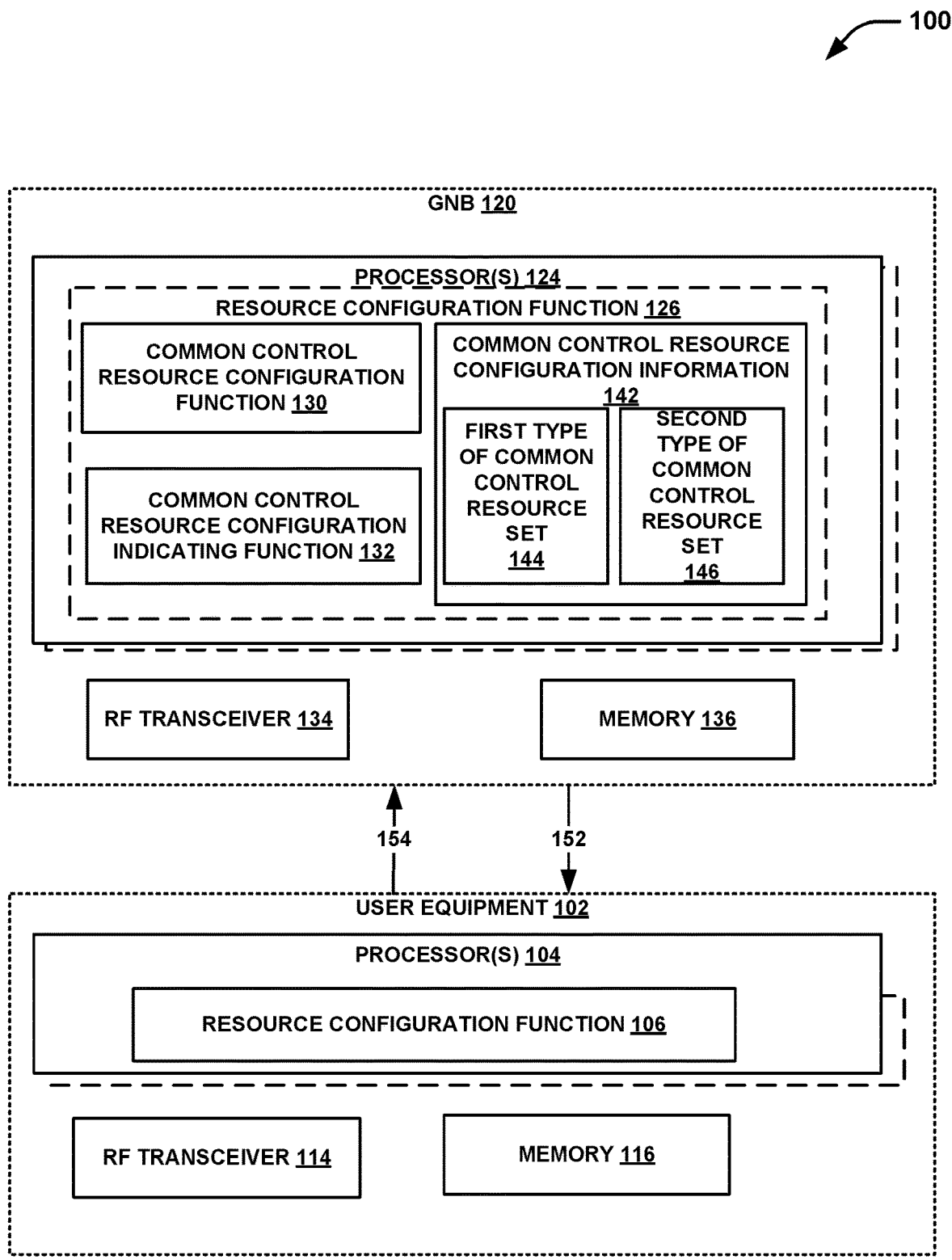
FIG. 1 is an example schematic diagram of a wireless communications system including an gNB having aspects of a resource configuration function in a wireless network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method, an apparatus, and/or a computer readable medium for configuring common control resource set at an gNB, which may include configuring, at the gNB, a first type and a second type of common control resource set, and indicating, to a user equipment (UE), the first type and the second type of common control resource set based at least on the configuration. The example method may further include indicating that the first type of common control resource set is committed control resources and the second type of common control resource set is opportunistic common control resource set. The committed common control resource set may be identified by master information blocks (MIB). The opportunistic common control resource set may be configured by remaining minimum system information (RMSI). In some implementations, the committed control resources may be referred to as a committed coreset, while the opportunistic control resources may be referred to as an opportunistic coreset. Furthermore, the example method may include indicating that the first type of common control resource set is committed common control resource set and the second type of common control resource set is an UE specific control resource set, and that the committed common control resource set is indicated via a master information block (MIB) and the UE specific control resource set is indicated via a radio resource control (RRC) signal. In some aspects, the committed common coreset will always appear (highest priority). The opportunistic common coreset may not appear, even of it is configured in the same subband as the committed common coreset. In some aspects, the UE specific coreset can be configured anywhere and can (partially) overlap with common coresets.

The various aspects described herein to configure common control resource set may enable gNB 120 to achieve/improve downlink transmission duty cycles and/or load balancing in 5G/NR networks. Various aspects of the present disclosure may balance conflicting requirements on gNB 120 for a low duty cycle and a low delay by allowing gNB 120 to selectively lower the duty cycle for power saving based on selective configuration of the common control resource set. Additionally, various aspects may further enable gNB 120 to have enough control transmission opportunities to enable sufficiently low delay times.

Referring to FIG. 1, in an aspect, a wireless communication system 100 includes an gNB 120, one or more processors 124, and/or a resource configuration function 126 running on a processor 124 (or processors 124 in a distributed computing environment) for transmitting a common control resource configuration 142 to UE 102. The common control resource configuration 142 may identify a first type of resources 144 and/or a second type of resource 146. In an aspect, gNB 120 and/or resource configuration function 126 may further include a common control resource configuration function 130, and/or a common control resource configuration indicating function 132. gNB 120 further includes a radio frequency (RF) transceiver 134 and/or a memory 136.

Wireless communication system 100 further includes one or more UEs 102, one or more processors 104, and/or a resource configuration function 106 running on processor 104 (or processors 104 in a distributed computing environment) for receiving common control resource configuration information 142, which may indicate first type of resources 144 and/or a second type of resources for decoding downlink transmissions. In an aspect, UE 102 may further include a RF transceiver 114 and/or a memory 116.

gNB 120 may be in communication with UE 102 via one or more over-the-air links, e.g., downlink (DL) 152 and/or uplink (UL) 154. In an aspect, DL 152 is generally used for communication from gNB 120 to UE 102 and UL 154 is generally used for communication from UE 102 to gNB 120. For example, gNB 102 may transmit common control resource configuration information 142 via downlink 152 and/or may receive communications from UE 102 via uplink 154.

gNB 120 may be a base station (BS) or Node B or eNodeB, a macro cell, a small cell (e.g., a femtocell, or a pico cell), a relay, a peer-to-peer device, etc. In an example aspect, the nodes may operate according to wireless local area network (WLAN) specification as defined in IEEE 802.11 and/or may operate according to Wideband Code Division Multiple Access (W-CDMA), Code Division Multiple Access (CDMA), Time Division Synchronous Code Division Multiple Access (TD-SCDMA), Long Term Evolution (LTE), Global System for Mobile Communications (GSM), 5G (NR) standard as defined in 3GPP Specifications.

UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 2:
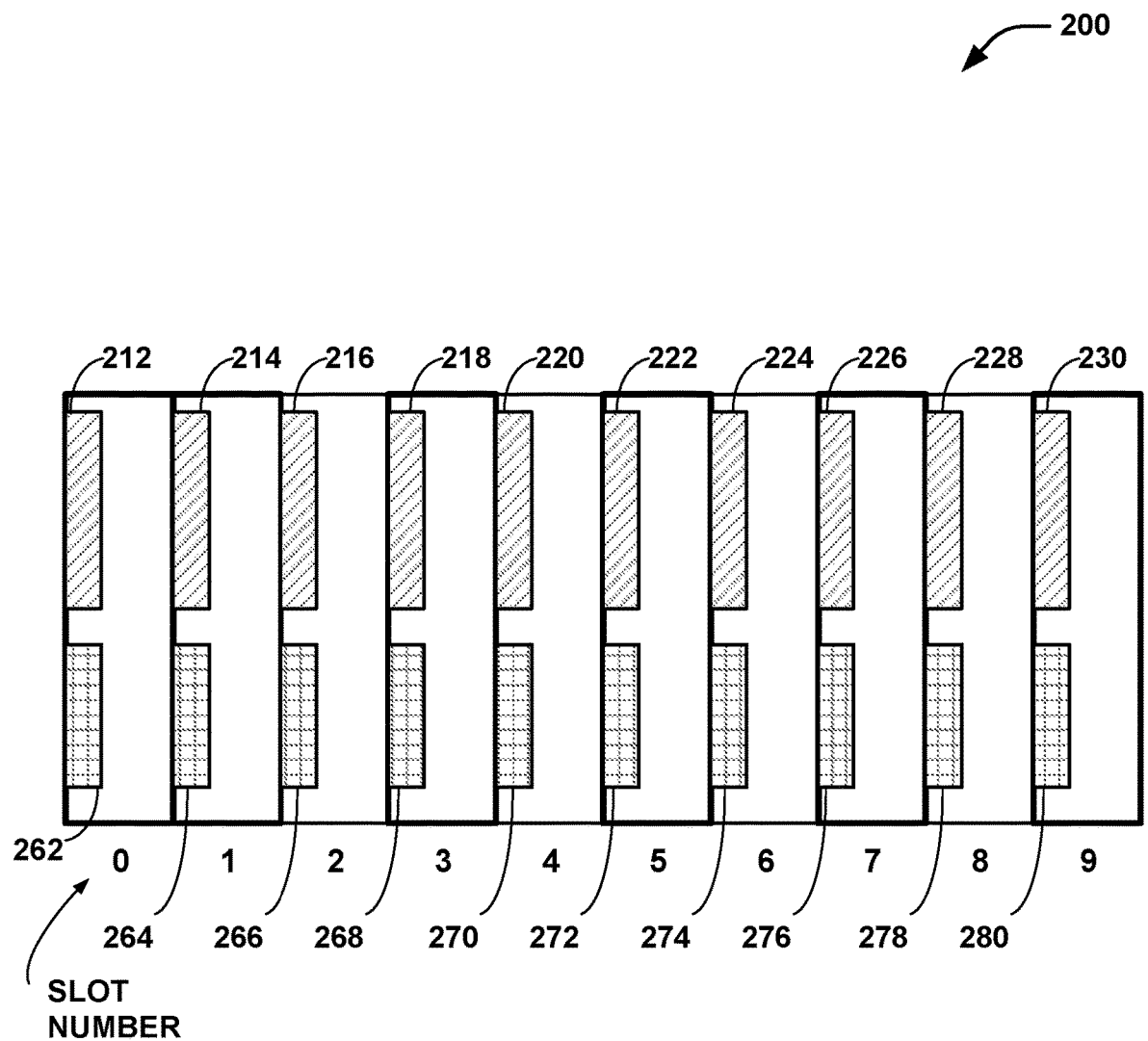
FIG. 2 illustrates an example common control resource configuration.

FIG. 2 illustrates an example common control resource configuration 200.

As illustrated in FIG. 2, a slot structure 200 with 10 slots (slots 0-9) is shown. In each slot, in some implementations, gNB 120 may configure common control resource set, also referred to as a common control resource set in each of the slots. For example, gNB 120 may configure common control resource set 262, 264, 266, 268, 270, 272, 274, 276, 278, and/or 280 in slots 0-9, respectively. Additionally, in some implementations, gNB 120 may configure UE specific control resources 212, 214, 216, 218, 220, 222, 224, 226, 228, and/or 230 in slots 0-9 respectively. For example, the UE specific control resources may be specific to UE 102. The resources may be defined as resources blocks (e.g., physical resource blocks (PRBs) or resource elements or coresets.

In some implementations, gNB 120 transmits the resource configuration information UE 102. UE 102 tries to decode control signals received from gNB 120 based on the resource configuration information. For example, in some cases, UE 102 may periodically monitor the common control resource set, to utilize the received control information, e.g., reference signals (RS), to perform radio link management (RLM) and/or, in some cases, to assist in other functionality such as time/frequency tracking. Additionally, in some cases, UE 102 may utilize the common resource set to assist the basic functionality of initial access. However, this configuration is not efficient, as common control resource set and UE specific resources may be transmitted in every slot even when there is no data for transmission on downlink from gNB 120 to UE 102. For instance, this configuration in every slot has a relatively high duty cycle, but may result in relatively low delay. Yet, there may be a desire to allow the gNB to reduce the duty cycle of the downlink transmission.

Figure 3:
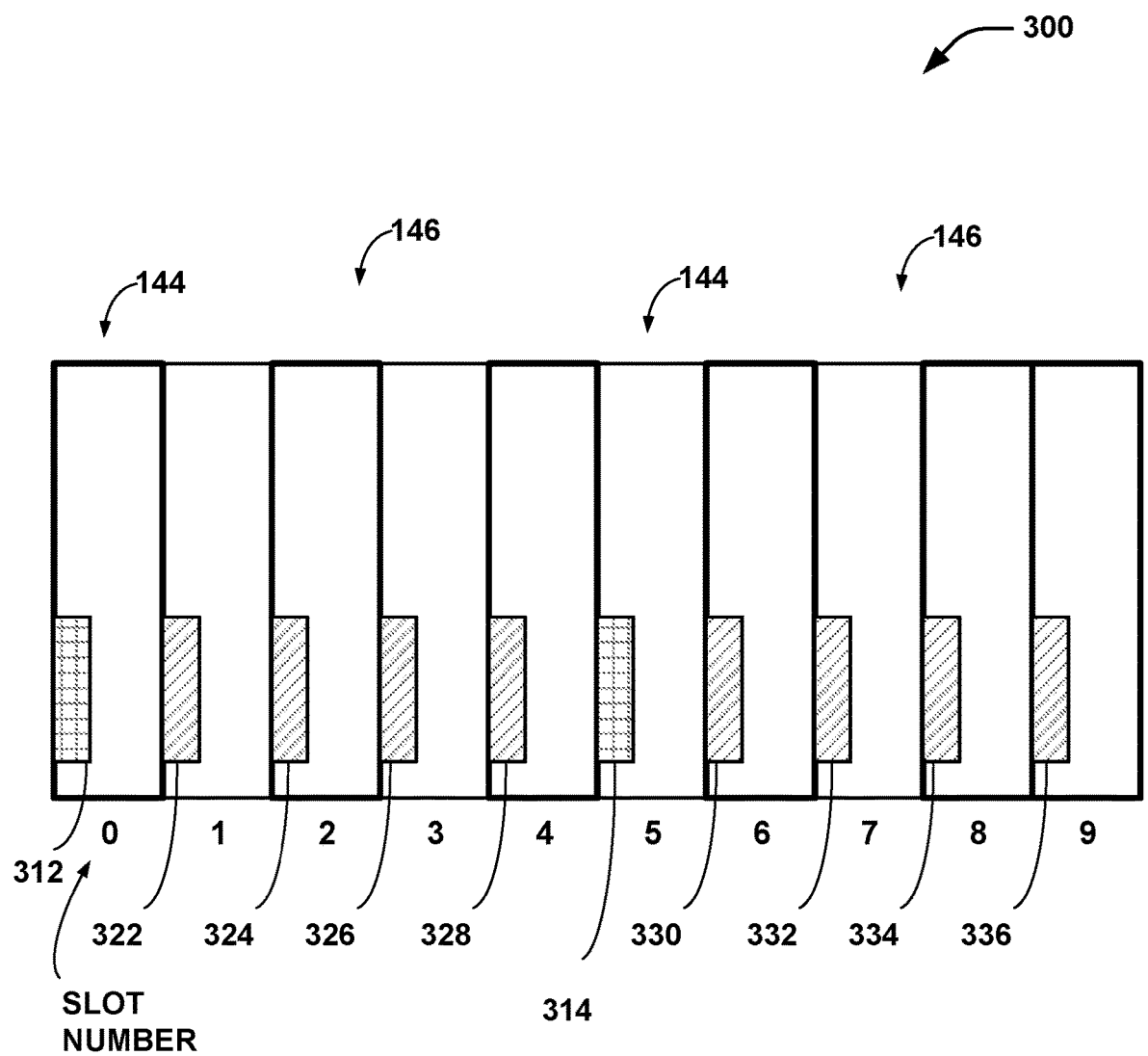
FIG. 3 illustrates an example common control resource configuration, in aspects of the present disclosure.

FIG. 3 illustrates an example common control resource configuration 300, in aspects of the present disclosure.

In one implementation, gNB 120 and/or resource configuration function 126 may define (or configure) two types of common control resource set (or two types of common control resource sets), for example, a first type of common control resource set 144 (referred to as committed common control resource set 144) and/or a second type of common control resource set 146 (referred to as opportunistic common control resource set 146). Committed common control resource set 144 and/or opportunistic common control resource set 146 may use a same structure, e.g., same set of resources, same channel estimation procedures, etc. Additionally, gNB 120 may indicate (to UE 102) the common control resource set configured for committed common control resource set 144 and/or opportunistic common control resource set 146 via a master information block (MIB), which is transmitted in a physical broadcast channel (PBCH) from gNB 120.

In one implementation, gNB 120 and/or resource configuration function 126 may configure committed common control resource set 144 in a subset of the slots. For example, committed common control resource set 144 may be configured in slot 0 (committed common control resource set 312) and slot 5 (committed common control resource set 314) as shown in FIG. 3. In some optional aspects, committed common control resource set 144 may be transmitted in the configured slots even if there is no data for transmission. That is, in such an optional aspect, committed common control resource set 144 are transmitted in slots 0 (committed common control resource set 312) and 5 (committed common control resource set 314) even if gNB 120 has no data for transmission on the downlink, and UE 102 may use committed common control resource set 144 transmitted in slots 0 (committed common control resource set 312) and 5 (committed common control resource set 314) for radio link management (RLM) and other measurements.

In an additional implementation, gNB 120 and/or resource configuration function 126 may configure opportunistic common control resource set 146 in a subset of the slots. The subset of the slots used for configuring opportunistic common control resource set 146 may be different from the subset of slots used for configuring committed common control resource set 144. For example, gNB 120 and/or resource configuration function 126 may configure opportunistic common control resource set 146 in slots in which committed common control resource set 144 are not configured. In other words, for example, but not limited hereto, gNB 120 and/or resource configuration function 126 may configure opportunistic common control resource set 146 in slots 1-4 and 6-9 (e.g., opportunistic common control resource set 322, 324, 326, 328, 330, 332, 334, and 336, respectively). Also, for example, in some cases, any common control resource set not used as committed common control resource set 144 may be considered to be opportunistic common control resource set 146. Further, in some cases, opportunistic common control resource set 146 may be transmitted only when gNB 120 has downlink control information (DCI) to transmit. If gNB 120 has no DCI to transmit in a slot (for example, slot 3), gNB 120 may skip transmitting opportunistic common control resource set 146 in that specific slot (e.g., slot 3), and gNB 120 may enter discontinuous transmission (DTX) state during slot 3 so that power savings may be achieved at UE 102 (as UE 102 does not have to perform decoding of the common resources for that slot).

Additionally, phase continuity between committed common control resource set 144 and opportunistic common control resource set 146 may be maintained to support channel estimation filtering, and phase continuity may be maintained across committed common control resource set 144 in the beginning of every slot. Further, UE 102 may use demodulation reference signal (DMRS), if present in opportunistic common control resource set 146, opportunistically. That is, UE 102 detects that a DMRS is being transmitted in opportunistic common control resource set 146 and may use the DMRS for measurements. Furthermore, UE 102 may be RRC configured with the availability of opportunistic common control resource set 146 instead of UE 102 performing a blind detection. This may slow down the configuration, but saves resources at UE 102 by avoiding the blind detection effort. Moreover, the above mechanism may allow message 2 of random access channel (RACH) procedure to be transmitted in both committed common control resource set 144 and opportunistic common control resource set 146, which may assist in reducing delays in downlink transmissions.

In various aspects implementing 5G/NR, as mentioned above, the MIB will indicate the committed common control resource set 144, which may be referred to as a remaining minimum system information (RMSI) coreset. In an aspect, the RMSI coreset may be physical downlink control channel (PDCCH) resources that identify a grant of RMSI physical downlink shared channel (PDSCH) resources. In some aspects, the RMSI coreset will always carry the RMSI grant. Further, depending on the implementation, the RMSI coreset may or may not include reference signals, such as a demodulation reference signal (DMRS). Additionally, in some implementations, any common control resource set not committed to carry RMSI PDCCH may become opportunistic common control resource set 146.

In some aspects, UE 102 may have an RMSI PDCCH monitoring window associated with an SS/PBCH block burst set, which recurs periodically. Each window may have a duration of x consecutive slots, for example, but not limited to, 1, 2, or 4 slots. In some implementations, the gNB 120 may set the duration of the monitoring window and indicate the duration in PBCCH. In some implementations, the duration of the monitoring window may depend on an associated frequency band. Additionally, a period, y, of the monitoring window may be the same as or different from a period of the SS/PBCH block burst set. For example, y may be, but is not limited to, 10, 20, 40, 80, or 160 ms. This periodicity may be frequency band dependent, and may be configured by gNB 120 in the PBCCH. Further, in some cases, the period may be dependent on a transmission time interval (TTI) of the RMSI coreset. For instance, the TTI of the RMSI coreset may be, but is not limited to, one of 80 ms or 160 ms. Also, in some implementations, there may be a dependency between the period of the monitoring window and the period of the SS/PBCH block burst set. In some aspects, gNB 102 may configure overlapping monitoring windows associated with different SS/PBCH block burst sets. Also, in some cases, the monitoring window may be indicated based on a time offset. Additionally, in some aspects, multiple control resource sets can be overlapped in frequency and time for UE 102.

Figure 4:
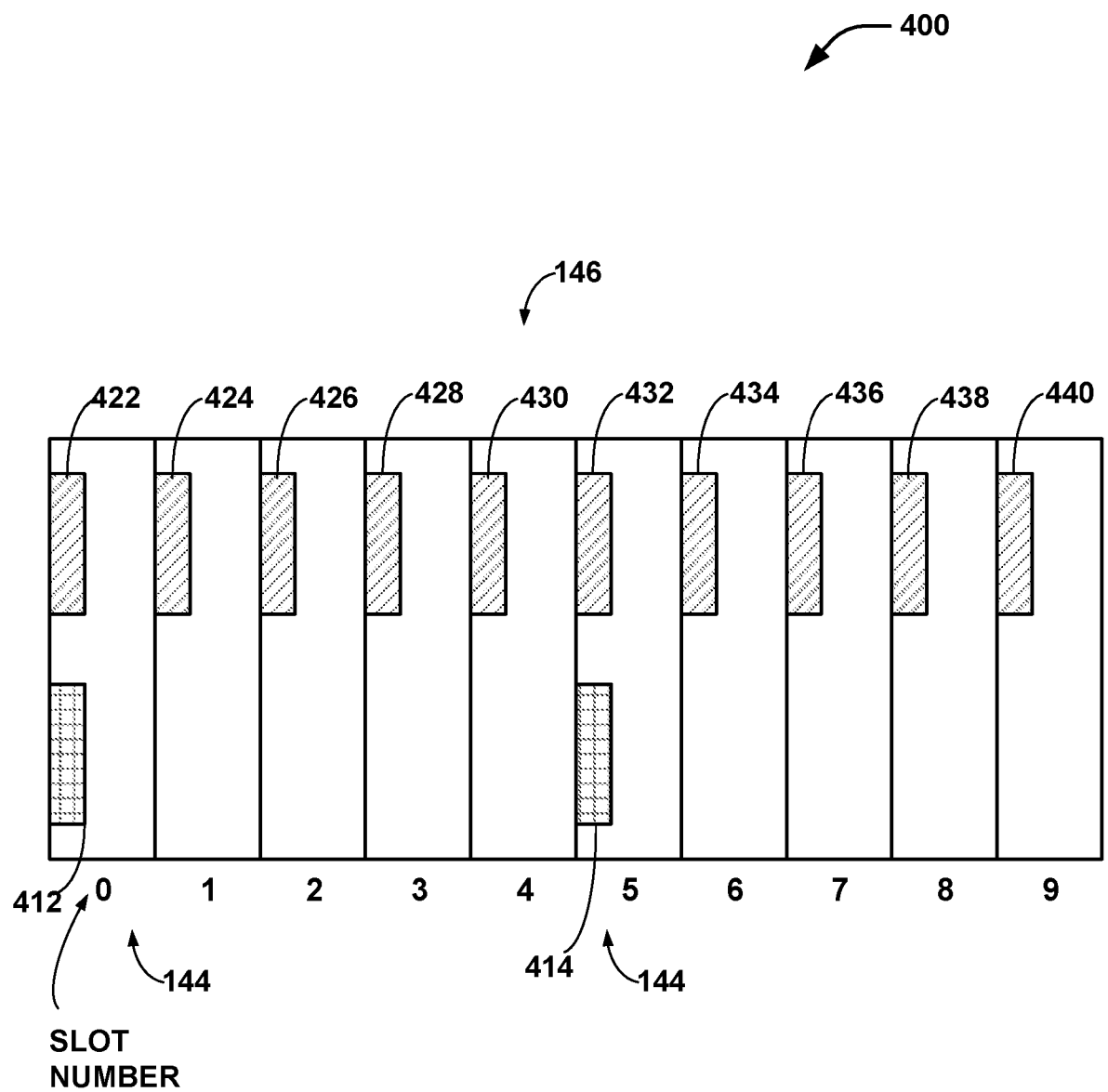
FIG. 4 illustrates an additional example common control resource configuration, in aspects of the present disclosure.

FIG. 4 illustrates an additional example common control resource configuration 400, in aspects of the present disclosure.

In one implementation, gNB 120 and/or resource configuration function 126 may define (or configure) two types of common control resource set (or two types of common control resource sets), for example, a first type of common control resource set 144 (referred to as committed common control resource set 144) and/or a second type of common control resource set 146 (referred to as UE specific control resources 146). Committed common control resource set 144 and/or UE specific control resources 146 may have a same or a different structure. That is, a same or a different set of resources may be used and/or a same channel estimation mode (e.g., wideband) or a different channel estimation mode maybe used.

In one implementation, gNB 120 and/or resource configuration function 126 may configure committed common control resource set 144 in a subset of the slots, as described above in reference to FIG. 3. For example, committed common control resource set 144 may be configured in slot 0 (committed common control resource set 412) and slot 5 (committed common control resource set 414) as shown in FIG. 4. Committed common control resource set 144 may be indicated by the MIB, as explained above. Committed common control resource set 144 may be transmitted in the configured slots even if there is no data for transmission. That is, committed common control resource set 144 may be transmitted in slots 0 (committed common control resource set 412) and 5 (committed common control resource set 414) even if gNB 120 has no data for transmission on the downlink, and UE 102 may use committed common control resource set 144 transmitted in slots 0 and 5 for radio link management and other measurements.

In an additional implementation, gNB 120 and/or resource configuration function 126 may configure UE specific control resources 146 in at least a subset of the slots or all of the slots or in the slots not used by committed common control resource set 144 or in some slots also used by committed common control resource set 144. For example, gNB 120 and/or resource configuration function 126 may configure UE specific control resources 146 in some subset of slots different from slots 0 and 5 that are being used by committed common control resource set 144, or in every one of slots 0-9 (e.g., UE specific control resources 422, 424, 426, 428, 430, 432, 434, 436, 438, and 440, respectively). UE specific control resources 146 may be indicated to UE 102 by the MIB, as explained above, or in another Radio Resource Control (RRC) message. Further, in some cases, UE specific control resources 146 is opportunistic in that it may be transmitted only when gNB 120 has downlink control information (DCI) to transmit. If gNB 120 has no DCI to transmit in a slot (for example, slot 3), gNB 120 may skip transmitting UE specific control resources 146 in that specific slot (e.g., slot 3), and gNB 120 may enter discontinuous transmission (DTX) state during slot 3 so that power savings may be achieved at UE 102 (as UE 102 does not have to perform decoding at the UE). It should also be noted that in slots 0 and 9, both committed common control resource set 144 and UE specific control resources 146 are transmitted. In such a scenario, committed common control resource set 144 and UE specific control resources 146 may be transmitted in different sub-bands. In some implementations, committed common control resource set 144 and UE specific control resources 146 may overlap in time and frequency.

Additionally, the above mechanism may allow message 2 of the four step random access channel (RACH) procedure to be transmitted only in committed common control resource set 144. This may lead to longer RACH delays, but provides flexibility in transmitting the two step RACH messages 2/4 in either committed common control resource set 144 or UE specific control resources 146.

Additionally, in some implementations, for a configured set of UE specific control resources 146, if continuous beamforming is configured (as a feature of the resource set), gNB 120 can add an additional flag in the RRC configuration for UE 102 to indicate if phase continuity is maintained over time. If maintained, then UE 102 can further filter the estimated channel over time for better channel estimation. If not maintained, then UE 102 should expect the phase to be not continuous across slots and should not filter. On the other hand, for per PRB beamforming, UE 102 will expect the beams to be different for different PRBs in the frequency domain in the same slot, and should not expect the same beam to be applied across slots.

Moreover, in some implementations, when committed common control resource set 144 and UE specific control resources 146 are configured in the same slot, both with continuous beamforming, and the resources are adjacent, it is possible for gNB 120 to introduce another flag in the RRC configuration of UE specific control resources 146 to indicate if UE 102 can assume continuous beamforming between the two sets of resources. If continuous, then UE 102 can perform single channel estimation cover both sets of resources. Otherwise, UE 102 needs to perform separate channel estimation for each set of resources.

Figure 5:
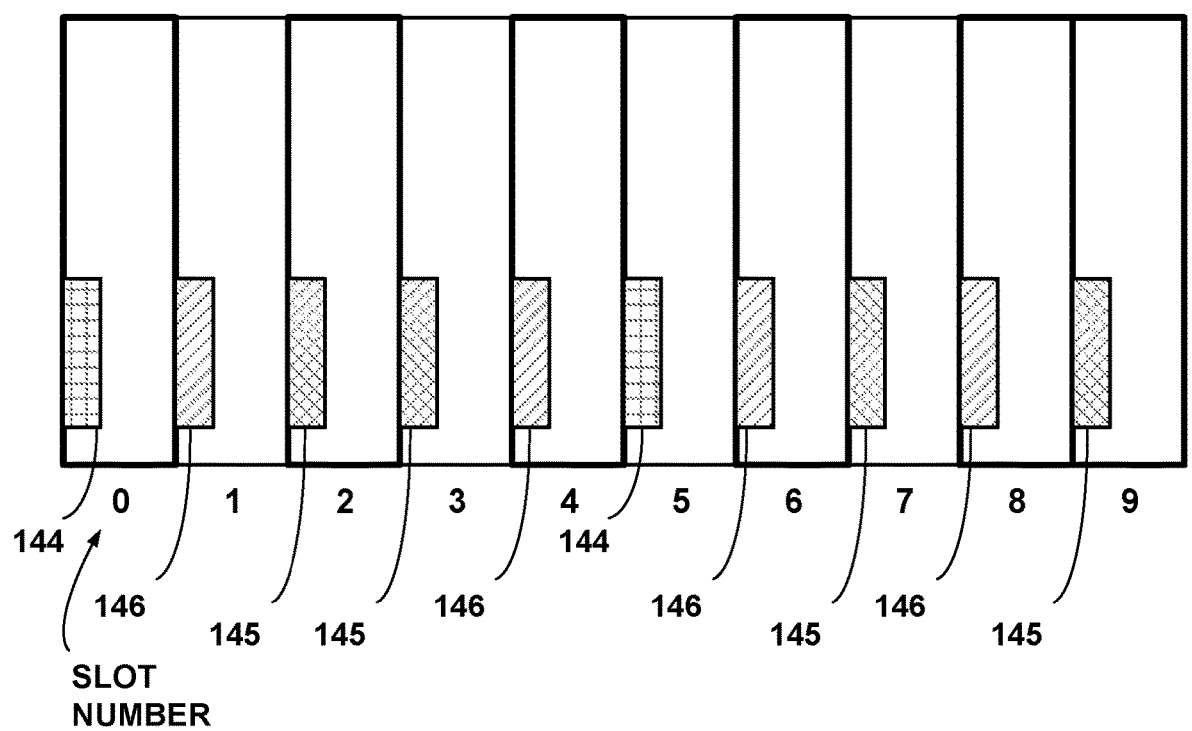
FIG. 5 illustrates another additional example common control resource configuration, in aspects of the present disclosure.

FIG. 5 illustrates another additional example common control resource configuration 500, in aspects of the present disclosure.

In some aspects of the present disclosure, gNB 120 may be operable to over-provision the common control resource set, such as in common control resource configuration 500. For example, gNB 120 may configure different sets of control resources 145 in a same slot and in overlapping PRBs. For example, the PRBs may be partially overlapping or fully overlapping. For instance, as illustrated in FIG. 5, gNB 120 may configure different sets of control resources 145, such as a set of committed common control resource set 144 that overlap with a set of UE specific control resources 146, or two sets of UE specific control resources 146 overlapping with one another. In one use case, for example, one of the overlapping sets of resources may be a super set of another such that gNB 120 can choose which set to use depending on the control channel load.

From the perspective of gNB 120, one of the overlapping resource sets can be used at a time. For example, but not limited hereto, if gNB 120 configures a set of (opportunistic) common control resource set to overlap with a set of UE specific control resources, then gNB 120 may choose to use the set of common control resource set in a selected slot, while choosing to use the set of UE specific control resources in another slot.

From the perspective of UE 102, the overlapping resource sets may not be evident. For example, in a first use case, UE 102 is provisioned with one of the sets of overlapping control resources while one or more different UEs are provisioned with a different one of the sets of overlapping control resources. In this case, UE 102 only attempts to detect the PDCCH in the configured set of control resources, so the other, overlapping set of control resources is transparent to UE 102. In other words, in this case, even if the other set of overlapping control resources is used by gNB 120 (e.g., for another UE), UE 102 will not be able to detect any PDCCH in the other set of overlapping control resources. In another example, in a second use case, UE 102 is provisioned with more than one set of overlapping control resources. In this case, UE 102 will attempt to detect PDCCH in all configured sets of control resources, while at most one of them will produce a successful decoding. Further, in this case, UE 102 may be provided with some rules to limit a total number of blind decodes to be performed.

Figure 6:
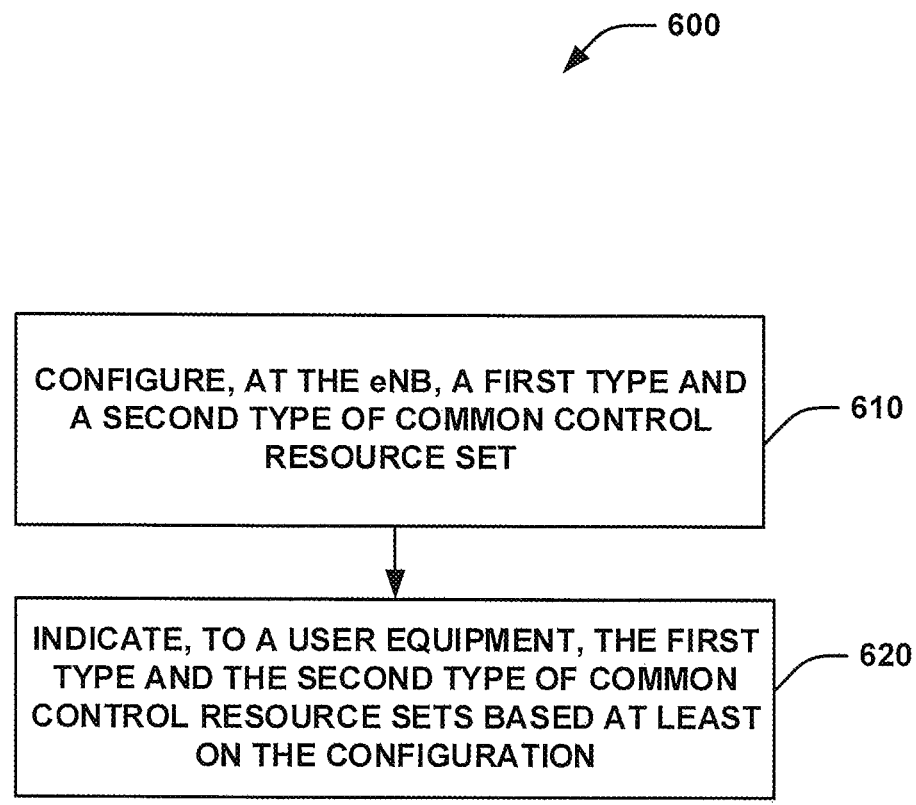
FIG. 6 is a flowchart of an example methodology for configuring common control resource set at an gNB, in aspects of the present disclosure.

FIG. 6 illustrates an example method 600 for configuring common control resource set at an gNB, in aspects of the present disclosure.

In an aspect, at block 610, method 600 may include configuring, at the gNB, a first type and a second type of common control resource set. For example, in an aspect, gNB 120 and/or resource configuration function 126 may include a common control resource configuration function 130, such as a specially programmed processor module, or a processor executing specially programmed code stored in a memory, to configure a first type (e.g., committed common control resource set 144) and a second type (opportunistic common control resource set 146 or UE specific control resources 146 of common control resource set).

In an aspect, at block 620, method 600 may include indicating, to a user equipment (UE), the first type and the second type of common control resource set based at least on the configuration. For example, in an aspect, gNB 120 and/or resource configuration function 126 may include a common control resource configuration indicating function 132, such as a specially programmed processor module, or a processor executing specially programmed code stored in a memory, to indicate, to UE 102, the first type (144) and the second type (146) of common control resource set based at least on the configuration (142). For example, gNB 120 may perform the indicating by providing an indicator in the MIB. The indicator may identify in which slots UE 102 may find the first type (144) and the second type (146) of common control resource set for decoding, and gNB 120 may configure such resources in the same or in different subsets of slots, and/or in separate or in overlapping PRBs within a respective slot. For example, in some implementations, the indicating may include indicating only or at least the committed common control resource set by transmitting an indication via the MIB. For instance, transmitting the indication via the MIB further includes transmitting physical downlink control channel (PDCCH) resources that identify granted physical downlink shared channel (PDSCH) resources for the first type (144) and the second type (146) of common control resource set for the UE.

Additional details pertaining to method 600 are also described in detail above.

For example, in some aspects, the indicating includes indicating at least the committed common control resource set at least partially via a master information block (MIB). Further, in some instances, the opportunistic common control resource set is any of the common control resource set not indicated as the committed common control resource set. Also, the method 600 may include transmitting nothing in the opportunistic common control resource set when the indicating fails to carry any downlink configuration information (DCI) for the opportunistic common control resource set.

In other aspects, the indicating indicates the committed control resources in a first subset of slots and the opportunistic common control resource set in a second subset of slots in a set of slots. In some instances, the first subset of slots and the second subset of slots are mutually exclusive.

In some aspects, the method 600 may further include always transmitting the committed common control resource set, and opportunistically transmitting the opportunistic common control resources only when there is control information for the UE.

In some aspects, the indicating includes indicating at least the opportunistic common control resource set via a radio resource control (RRC) message.

Also, in some cases, the method 600 may further include transmitting a message 2 of a random access channel procedure via both the committed common control resource set and the opportunistic common control resource set.

Additionally, in some aspects, indicating the first type and the second type of the common control resource set further comprises indicating sets of resources that at least partially overlap in time and frequency. In some instances, the method 600 may further include the gNB 120 selecting one of the first type or the second type of the common control resource set that at least partially overlap in time and frequency within a slot, and transmitting information for the UE in the slot using only the one of the first type or the second type of common control resource set.

Further, in some aspects, the first type of common control resource set is a committed common control resource set and the second type of common control resource set is an UE specific control resource set. In this case, the method 600 may further include gNB 120 always transmitting the committed common control resource set and opportunistically transmitting the UE specific control resource set only when there is control information for the UE. Also, in this case, the committed common control resource set may be indicated via a master information block (MIB) and the UE specific control resource set may be indicated via a radio resource control (RRC) signal.

Additionally, this case the method 600 may further include gNB 120 transmitting broadcast downlink control information (DCI) on the UE specific control resource set.

Also, in some aspects, the method 600 may further include gNB 120 transmitting a four-step message 2 of a random access channel procedure via only the committed common control resource set, or transmitting a two-step message 2 of the random access channel procedure via either the committed common control resource set or the UE specific control resource set.

In other aspects, the method 600 may also include gNB 120 transmitting using beamforming, and transmitting a continuity indicator, e.g., a flag, to identify whether phase continuity is maintained over time in response to transmitting using the beamforming. In some cases, the method 600 may also include gNB 120 transmitting both the committed common resources and the UE specific control resource set in a same slot using beamforming, and transmitting a beamforming continuity indicator, e.g., a flag, to identify whether continuous beamforming is used across both the committed common resources and the UE specific control resource set when the committed common resources and the UE specific control resource set are adjacently located.

Figure 7:
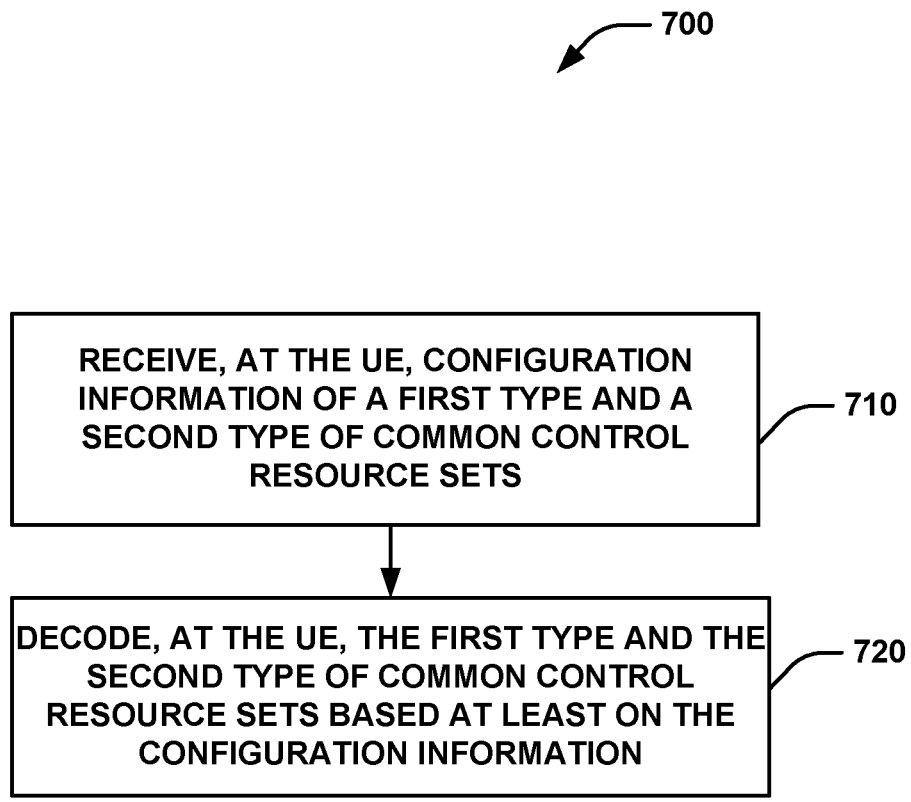
FIG. 7 is a flowchart of an example methodology for configuring common control resource set at an UE, in aspects of the present disclosure.

FIG. 7 illustrates an example method 700 for configuring common control resource set at an UE, in aspects of the present disclosure.

In an aspect, at block 710, method 700 may include receiving, at the UE, configuration information of a first type and a second type of common control resource set from an gNB. For example, in an aspect, UE 102 and/or processor 104 may include a resource configuration function 126, such as a specially programmed processor module, or a processor executing specially programmed code stored in a memory, to receive configuration information from an gNB 120 of a first type (e.g., committed common control resource set 144) and a second type (opportunistic common control resource set 146).

In an aspect, at block 720, method 700 may include decoding, at the UE, the first type and the second type of common control resource set based at least on the configuration information. For example, in an aspect, UE 102 and/or processor 104 may include a resource configuration function 126, such as a specially programmed processor module, or a processor executing specially programmed code stored in a memory, to decode the configuration information received from an gNB 120 to identify the first type (e.g., committed common control resource set 144) and the second type (opportunistic common control resource set 146) using the configuration information.

Additional aspects pertaining to methodology 700 are also described in detail above.

For example, in an aspect, the first type of the common control resource set is a committed control resources and the second type of the common control resource set is an opportunistic common control resource set. In this case, receiving the configuration information comprises receiving the configuration information for at least the committed common control resource set at least partially via a master information block (MIB). Further, in some aspects, the opportunistic common control resource set is any of the common control resource set not indicated as the committed common control resource set. Also, the method 700 may further include UE 102 skipping decoding of the opportunistic common control resource set when the configuration information fails to carry any downlink configuration information (DCI) for the opportunistic common control resource set.

In other aspects, the configuration information indicates the committed control resources in a first subset of slots and the opportunistic common control resource set in a second subset of slots in a set of slots. In this case, the first subset of slots and the second subset of slots may be mutually exclusive.

Further, in some aspects, the method 700 may further include UE 102 always decoding the committed common control resource set, and opportunistically decoding the opportunistic common control resources only when the configuration information indicates there is control information for the UE.

Also, in some instances, the method 700 may further include UE 102 receiving the configuration information for at least the opportunistic common control resource set via a radio resource control (RRC) message.

Additionally, in some aspects, the method 700 may further include UE 102 decoding a message 2 of a random access channel procedure in both the committed common control resource set and the opportunistic common control resource set.

Moreover, in some instances, the method 700 may further include UE 102 receiving the configuration information that indicates that the first type and the second type of the common control resource set comprise sets of resources that at least partially overlap in time and frequency. In this case, in some instances, the method 700 may further include UE 102 decoding only one of the first type or the second type of the common control resource set within a slot based on the configuration information.

Further, in some aspects of the method 700, the first type of common control resource set is a committed common control resource set and the second type of common control resource set is an UE specific control resource set. In this case, in some instances, the method 700 may further include UE 102 always decoding the committed common control resource set and opportunistically decoding the UE specific control resource set only in response to the configuration information indicating a grant corresponding to the UE specific control resource set.

In some aspects of the method 700, receiving the configuration information comprises receiving a first indication of the committed common control resource set via a master information block (MIB) and receiving a second indication of the UE specific control resource set via a radio resource control (RRC) signal.

Additionally, in some cases, the method 700 may further include UE 102 decoding broadcast downlink control information (DCI) on the UE specific control resource set. Also, the method 700 may further include UE 102 decoding a four-step message 2 of a random access channel procedure via only the committed common control resource set, or decoding a two-step message 2 of the random access channel procedure via either the committed common control resource set or the UE specific control resource set.

Further, in aspects where the configuration information identifies that continuous beamforming is configured for the UE specific control resource set, the method 700 may further include UE 102 receiving a continuity indicator that identifies whether phase continuity is maintained over time for the UE specific control resource set, and filtering or not filtering an estimated channel over time when performing channel estimation based on the continuity indicator.

Moreover, in aspects where the configuration information identifies that physical resource block (PRB) beamforming is configured for the UE specific control resource set, the method 700 may further include UE 102 filtering an estimated channel over time and frequency when performing channel estimation in response to the PRB beamforming.

Also, in cases where the configuration information identifies that the committed common resources and the UE specific control resource set are adjacently located and are subject to continuous beamforming, the method 700 may further include UE 102 receiving a continuity indicator that identifies whether phase continuity is maintained between the committed common resources and the UE specific control resource set in a slot, and performing a single channel estimation over both the committed common resources and the UE specific control resource set in the slot, or performing separate channel estimations on each of the committed common resources and the UE specific control resource set in the slot, based on the continuity indicator.

Thus, as described above, gNB 120 may configure common control resource set for achieving power savings at UE 102.

As used in this application, the terms "function," "process," "system" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a process. One or more modules can reside within a module and/or thread of execution and a module may be localized on one computer and/or distributed between two or more computers. In addition, these modules can execute from various computer readable media having various data structures stored thereon. The processes may communicate by way of local and/or remote modules such as in accordance with a signal having one or more data packets, such as data from one module interacting with another module in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

As those skilled in the art will readily appreciate, various aspects described throughout this disclosure may be extended to other telecommunication systems, network architectures and communication standards.

By way of example, various aspects described herein related to RACH preamble transmission may be extended to other UMTS and/or LTE and/or other systems where UE has bursty data to transmit which is not suitable for establishing a dedicated channel (e.g., during a forward access channel (CELL FACH) state)). For example, such UMTS systems may include TD-SCDMA, High Speed Downlink Packet Access (HSDPA), High Speed Uplink Packet Access (HSUPA), High Speed Packet Access Plus (HSPA+) and TD-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method of processing a common control resource set at a user equipment (UE), comprising:
   receiving, at the UE from a base station, configuration information of a first type of common control resources at least partially via a master information block (MIB) and a second type of common control resources, wherein the MIB is received during a monitoring window having a duration set by the base station; and
   decoding, at the UE, the first type of common control resources and the second type of common control resources based at least on the configuration information, wherein the first type of common control resources are received in a first subset of slots and the second type of common control resources are received in a second subset of slots, and wherein the configuration information indicates that the first type of common control resources and the second type of common control resources comprise sets of resources that at least partially overlap in time and frequency, wherein the first type of common control resources includes committed common control resources and the second type of common control resources includes UE specific control resources, and decoding the committed common control resources in each of the first subset of slots and decoding the UE specific control resources only in response to the configuration information indicating a grant corresponding to the UE specific control resources.

2. The method of claim 1, wherein receiving the configuration information comprises receiving the configuration information of the second type of common control resources at least partially via remaining minimum system information (RMSI).

3. The method of claim 1, wherein the decoding further comprises decoding the second type of common control resources in response to an indication in the configuration information that there is control information for the UE in at least the MIB or remaining minimum system information (RMSI).

4. The method of claim 1, further comprising:
   receiving a message 2 of a random access channel procedure in both the first type of common control resources and the second type of common control resources; and
   decoding the message 2 of the random access channel procedure in both the first type of common control resources and the second type of common control resources.

5. The method of claim 1, wherein the decoding further comprises decoding only one of the first type or the second type of common control resources within a slot based on the configuration information.

6. The method of claim 1, wherein receiving the configuration information comprises receiving a first indication of the committed common control resources via the MIB and receiving a second indication of the UE specific control resources via a radio resource control (RRC) signal.

7. The method of claim 1, further comprising decoding a four-step message 2 of a random access channel procedure via only the committed common control resources, or decoding a two-step message 2 of the random access channel procedure via either the committed common control resources or the UE specific control resources.

8. The method of claim 1, wherein the configuration information identifies that continuous beamforming is configured for the UE specific control resources, further comprising:
   receiving a continuity indicator that identifies whether phase continuity is maintained over time for the UE specific control resources; and
   filtering or not filtering an estimated channel over time when performing channel estimation based on the continuity indicator.

9. The method of claim 1, wherein the configuration information identifies that physical resource block (PRB) beamforming is configured for the UE specific control resources, further comprising:
   filtering an estimated channel over time and frequency when performing channel estimation in response to the PRB beamforming.

10. The method of claim 1, wherein the configuration information identifies that the committed common control resources and the UE specific control resources are adjacently located and are subject to continuous beamforming, further comprising:
    receiving a continuity indicator that identifies whether phase continuity is maintained between the committed common control resources and the UE specific control resources in a slot; and
    performing a single channel estimation over both the committed common control resources and the UE specific control resources in the slot, or performing separate channel estimations on each of the committed common control resources and the UE specific control resources in the slot, based on the continuity indicator.

11. A user equipment (UE) for wireless communications, comprising:
    a transceiver;
    a memory; and
    a processor communicatively coupled with the transceiver and the memory, and configured to:
      receive, from a base station, configuration information of a first type of common control resources at least partially via a master information block (MIB) and a second type of common control resources, wherein the MIB is received during a monitoring window having a duration set by the base station; and
      decode the first type of common control resources and the second type of common control resources based at least on the configuration information, wherein the first type of common control resources are received in a first subset of slots and the second type of common control resources are received in a second subset of slots, and wherein the configuration information indicates that the first type of common control resources and the second type of common control resources comprise sets of resources that at least partially overlap in time and frequency, wherein the first type of common control resources includes committed common control resources and the second type of common control resources includes UE specific control resources, and decoding the committed common control resources in each of the first subset of slots and decoding the UE specific control resources only in response to the configuration information indicating a grant corresponding to the UE specific control resources.

12. The UE of claim 11, wherein receiving the configuration information comprises receiving the configuration information of the second type of common control resources at least partially via remaining minimum system information RMSI.

13. The UE of claim 11, wherein the processor is further configured to decode the second type of common control resources in response to an indication in the configuration information that there is control information for the UE in at least the MIB or remaining minimum system information (RMSI).

14. The UE of claim 11, wherein the processor is further configured to:
receive a message 2 of a random access channel procedure in both the first type of common control resources and the second type of common control resources; and
decode the message 2 of the random access channel procedure in both the first type of common control resources and the second type of common control resources.

15. The UE of claim 11, wherein the processor is further configured to decode only one of the first type or the second type of common control resources within a slot based on the configuration information.

16. The UE of claim 11, wherein receiving the configuration information comprises receiving a first indication of the committed common control resources via the MIB and receiving a second indication of the UE specific control resources via a radio resource control (RRC) signal.

17. The UE of claim 11, wherein the processor is further configured to decode a four-step message 2 of a random access channel procedure via only the committed common control resources, or decoding a two-step message 2 of the random access channel procedure via either the committed common control resources or the UE specific control resources.

18. The UE of claim 11, wherein the configuration information identifies that continuous beamforming is configured for the UE specific control resources, further comprising:
receiving a continuity indicator that identifies whether phase continuity is maintained over time for the UE specific control resources; and
filtering or not filtering an estimated channel over time when performing channel estimation based on the continuity indicator.

19. The UE of claim 11, wherein the configuration information identifies that physical resource block (PRB) beamforming is configured for the UE specific control resources, further comprising:
filtering an estimated channel over time and frequency when performing channel estimation in response to the PRB beamforming.

20. The UE of claim 11, wherein the configuration information identifies that the committed common control resources and the UE specific control resources are adjacently located and are subject to continuous beamforming, further comprising:
receiving a continuity indicator that identifies whether phase continuity is maintained between the committed common control resources and the UE specific control resources in a slot; and
performing a single channel estimation over both the committed common control resources and the UE specific control resources in the slot, or performing separate channel estimations on each of the committed common control resources and the UE specific control resources in the slot, based on the continuity indicator.

21. A user equipment (UE) for processing common control resources, comprising:
means for receiving from a base station, at the UE, configuration information of a first type of common control resources at least partially via a master information block (MIB) and a second type of common control resources, wherein the MIB is received during a monitoring window having a duration set by the base station; and
means for decoding, at the UE, the first type of common control resources and the second type of common control resources based at least on the configuration information, wherein the first type of common control resources are received in a first subset of slots and the second type of common control resources are received in a second subset of slots, and wherein the configuration information indicates that the first type of common control resources and the second type of common control resources comprise sets of resources that at least partially overlap in time and frequency, wherein the first type of common control resources includes committed common control resources and the second type of common control resources includes UE specific control resources, and decoding the committed common control resources in each of the first subset of slots and decoding the UE specific control resources only in response to the configuration information indicating a grant corresponding to the UE specific control resources.

22. A non-transitory computer-readable medium of a user equipment (UE) having stored thereon, processor executable code to cause a processor to process common control resources, comprising:
code for receiving, at the UE from a base station, configuration information of a first type of common control resources at least partially via a master information block (MIB) and a second type of common control resources, wherein the MIB is received during a monitoring window having a duration set by the base station; and
code for decoding, at the UE, the first type of common control resources and the second type of common control resources based at least on the configuration information, wherein the first type of common control resources are received in a first subset of slots and the second type of common control resources are received in a second subset of slots, and wherein the configuration information indicates that the first type of common control resources and the second type of common control resources comprise sets of resources that at least partially overlap in time and frequency, wherein the first type of common control resources includes committed common control resources and the second type of common control resources includes UE specific control resources, and decoding the committed common control resources in each of the first subset of slots and decoding the UE specific control resources only in response to the configuration information indicating a grant corresponding to the UE specific control resources.

23. The method of claim 1, wherein the base station comprises a gNB.

24. The method of claim 1, wherein the duration comprises one or more slots.

25. The method of claim 1, wherein the duration is based on an associated frequency band.

26. The method of claim 1, wherein the configuration information indicates that the first type of common control resources and the second type of common control resources comprise sets of resources that overlap within one or more slots.

27. The method of claim 1, wherein the configuration information indicates that the first type of common control resources and the second type of common control resources comprise sets of resources that overlap in frequency across one or more slots.

28. The method of claim 1, wherein the configuration information indicates that the first type of common control resources and the second type of common control resources comprise sets of resources that are non-overlapping in one or more slots.

29. The method of claim 1, wherein the configuration information indicates that the first type of common control resources and the second type of common control resources comprise sets of resources that are fully overlapping.

30. The method of claim 1, wherein the slots of the first subset also belong to the second subset.

31. The method of claim 1, wherein none of the slots of the first subset are part of the second subset.

32. The method of claim 1, wherein one or more of the slots of the first subset also belong to the second subset.

33. A base station for wireless communications, comprising:
    a transceiver;
    a memory; and
    a processor communicatively coupled with the transceiver and the memory, and operable to:
        configure a common control resource set including a first type of common control resources and a second type of common control resources, wherein the first type of common control resources are configured in a first subset of slots and the second type of common control resources are configured in a second subset of slots, and wherein configuration information indicates that the first type of common control resources and the second type of common control resources comprise sets of resources that at least partially overlap in time and frequency, wherein the first type of common control resources includes committed common control resources and the second type of common control resources includes UE specific control resources; and
        indicate, to a user equipment (UE) at least partially via a master information block (MIB), the configuration information of the first type of common control resources and the second type of common control resources, wherein the MIB is configured to be transmitted during a monitoring window having a duration set by the base station, wherein the configuration information indicates to the UE to decode the committed common control resources in each of the first subset of slots and to decode the UE specific control resources only in response to the configuration information indicating a grant corresponding to the UE specific control resources.

34. The base station of claim 33, wherein the configuration information comprises a first indication of the committed common control resources via the MIB and a second indication of the UE specific control resources via a radio resource control (RRC) signal.

* * * * *